United States Patent [19]
Lai

[11] Patent Number: 5,351,129
[45] Date of Patent: Sep. 27, 1994

[54] VIDEO MULTIPLEXOR-ENCODER AND DECODER-CONVERTER

[75] Inventor: Patrick Lai, Alameda, Calif.

[73] Assignee: RGB Technology D/B/A RGB Spectrum, Alameda, Calif.

[21] Appl. No.: 856,584

[22] Filed: Mar. 24, 1992

[51] Int. Cl.$^5$ .................. H04N 5/262; H04N 5/272; H04N 9/74
[52] U.S. Cl. .................... 348/584; 345/115; 348/578
[58] Field of Search .......... 358/181, 183, 22; 395/153, 154; 340/721

[56] References Cited

U.S. PATENT DOCUMENTS

| | | | |
|---|---|---|---|
| 4,001,881 | 1/1977 | Folsom | 360/5 |
| 4,259,690 | 3/1981 | Nakanishi et al. | 358/183 |
| 4,623,915 | 11/1986 | Bolger | 358/183 X |
| 4,692,757 | 9/1987 | Tsuhara et al. | 340/721 |
| 4,729,028 | 3/1988 | Micic et al. | 358/183 |
| 4,745,479 | 5/1988 | Waehner | 358/183 |
| 4,814,869 | 3/1989 | Oliver, Jr. | 358/108 |
| 4,855,833 | 8/1989 | Kageyama et al. | 358/183 |
| 4,876,600 | 10/1989 | Pietzsch et al. | 358/183 |
| 4,890,257 | 12/1989 | Anthias et al. | 340/721 |
| 4,905,077 | 2/1990 | Ishii | 358/22 |
| 4,920,424 | 4/1990 | Hosaka et al. | 358/343 |
| 4,943,854 | 7/1990 | Shiota et al. | 358/108 |
| 4,947,257 | 8/1990 | Fernandez et al. | 358/183 |
| 4,984,082 | 1/1991 | Okamura | 358/183 |
| 4,991,013 | 2/1991 | Kobayashi | 358/183 |
| 5,012,342 | 4/1991 | Olsen et al. | 358/181 |
| 5,019,905 | 5/1991 | Pshtissky et al. | 358/146 |
| 5,068,650 | 11/1991 | Fernandez et al. | 358/183 |
| 5,115,314 | 5/1992 | Ross et al. | 358/181 |
| 5,124,691 | 6/1992 | Sakamoto et al. | 340/721 |

OTHER PUBLICATIONS

Data Sheets for American Dynamics AD1484–Series SelectaView (2 sheets).
Data Sheets for Colorado Video, Inc., 496/497 Series Video Multiplexing Instruments (4 sheets).
Data Sheets for Colorado Video, Inc., Video Multiplexer 496A/B (2 sheets).

Primary Examiner—Mark R. Powell
Assistant Examiner—John W. Miller
Attorney, Agent, or Firm—David J. Larwood

[57] ABSTRACT

A video multiplexor-encoder and decoder-converter includes a video multiplexor and encoder for selectively receiving, time-division multiplexing and encoding multiple video signals representing multiple video images for transfer and simultaneous display thereof in a selected pattern of multiple video windows on a video display device, and further includes a decoder and video converter for receiving, decoding and converting an encoded, time-division multiplexed video signal for selective, simultaneous display of the multiple video images in the selected pattern of multiple video windows on a video display device. The encoded, multiplexed video signal includes display control data which selectively represent a position, size and relative visibility priority for each one of the video images within the selected display pattern of multiple video windows.

29 Claims, 6 Drawing Sheets

DISPLAYED
PATTERN
OF VIDEO
IMAGES

PRIORITIZED
VIDEO
IMAGES

VIDEO MULTIPLEXOR-ENCODER AND DECODER-CONVERTER

BACKGROUND OF THE INVENTION

1. Field of the Invention

The present invention relates to video systems for multiplexing and encoding multiple video signals, and in particular, to video systems for encoding time-multiplexed video signals with selected display parameters which cause the associated video display to be a pattern of multiple video windows having selected window positions, sizes and visibilities.

2. Description of the Related Art

As video signal processing systems have increased and decreased in their sophistication and cost, respectively, their features and applications have increased accordingly. One feature in particular which has become increasingly popular is that of displaying multiple video "windows," wherein multiple video images are displayed either adjacent to one another or overlapping one another. Such a "windowed" display is formed by overlaying, or "keying," one or more video images over one another or over a shared background. The resulting composite video image can then be viewed or recorded, e.g. on a tape recorder, for later viewing. However, the individual video window images no longer include all of their original video information; i.e. only a portion of the original video information is retained since each video window image has been either compressed to fit within its respective window or "cropped" to display only a portion of the original image.

A partial solution to this is to time-multiplex, or interleave, the various video signals representing the video images sought to be viewed or recorded, with each video frame displayed on its own monitor with full resolution but at a reduced frame update rate. The foregoing techniques allow each video image to be viewed or recorded for later viewing, albeit with reduced resolution or update rates. However, no video window information, such as the selected position or size of each video window, is available. Therefore, any video windowing being viewed, which may have originally been done with the video images, cannot be reconstructed.

Accordingly, a limitation of the prior art has been the inability to combine multiple video images in a selectively windowed display, with selected window locations, sizes, update rates and viewing priorities suitable for transmission, or recording for later viewing, with reconstruction of the original, selected video windows.

SUMMARY OF THE INVENTION

A video multiplexor-encoder and decoder-converter in accordance with the present invention provides means for receiving, time-division multiplexing and encoding multiple video signals representing a plurality of video images for transfer (e.g. transmission or recording) and simultaneous display thereof in a pattern of multiple video windows. The present invention further provides means for receiving, decoding and converting an encoded, time-division multiplexed video signal representing multiple video images for simultaneous display thereof in a preselected pattern of multiple video windows.

In a preferred embodiment of the present invention, a multiplexor receives and selectively time-division multiplexes multiple video signals which represent multiple corresponding video images, and provides a multiplexed video signal with user-assignable image update rates. An encoder receives and selectively encodes the multiplexed video signal to produce a selectively encoded, multiplexed video signal which includes display control data selectively representing a position, size and relative visibility priority for each of the multiple corresponding video images within a display pattern of multiple video windows.

An alternative preferred embodiment of the present invention includes a decoder for receiving and decoding an encoded, time-division multiplexed video signal by copying display control data included therein which selectively represents a position, size and relative visibility priority for each one of multiple video images within a display pattern of multiple video windows. A converter receives the copied display control data, and in selective accordance therewith, receives and converts the encoded, time-division multiplexed video signal to provide a unified video signal which represents the multiple video images with the display pattern of multiple video windows (with each video image having its original user-assigned update rate).

These and other features and advantages of the present invention will be understood upon consideration of the following detailed description of the invention and the accompanying drawings.

DETAILED DESCRIPTION OF THE INVENTION

Figure 1:
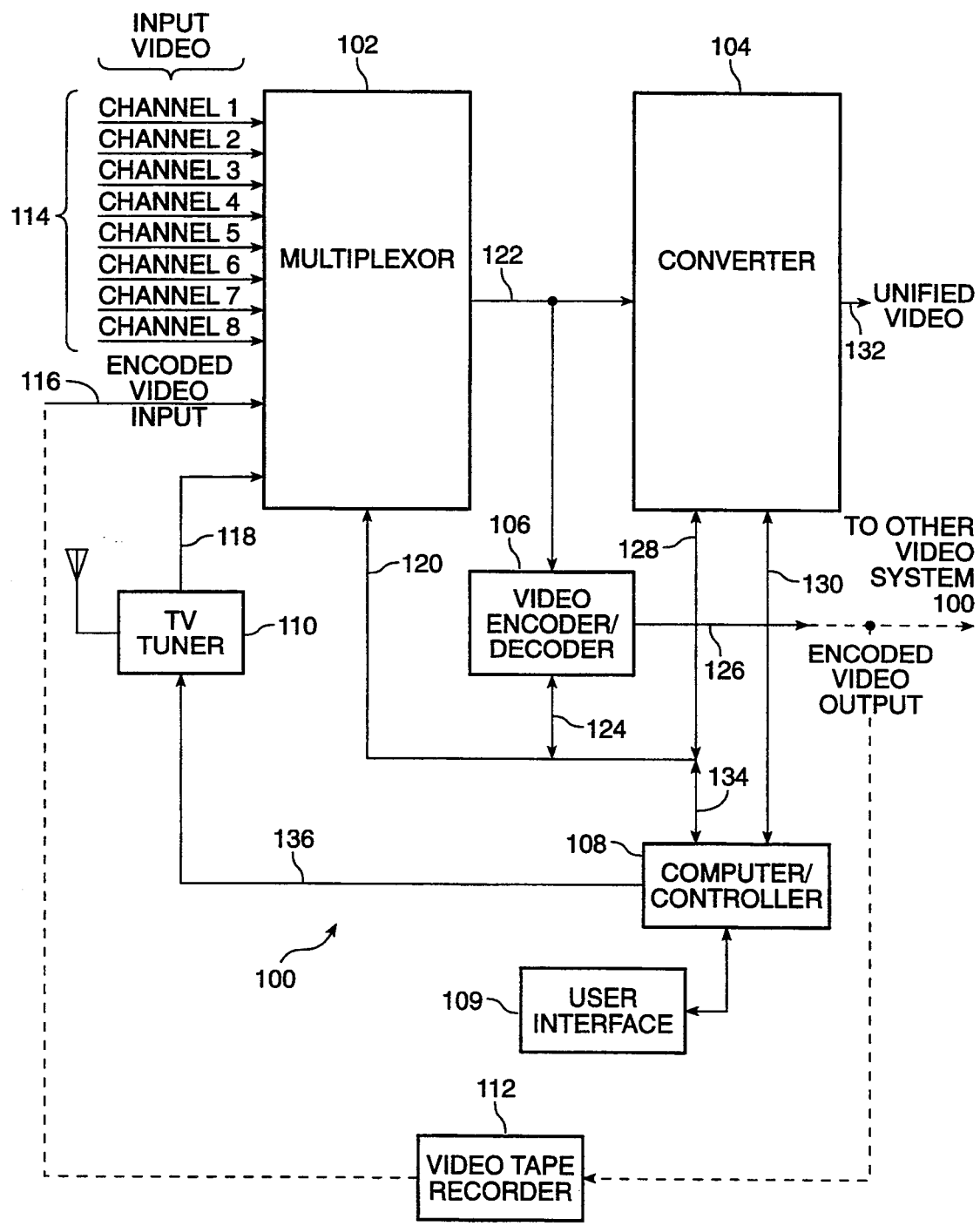
FIG. 1 is a functional block diagram of a video system using a video multiplexor-encoder and decoder-converter in accordance with the present invention.

Referring to FIG. 1, a video system 100 using a video multiplexor-encoder and decoder-converter in accordance with the present invention includes a multiplexor 102, converter 104, video encoder/decoder 106, computer/controller 108, user interface 109 and television tuner 110, all interconnected substantially as shown. As discussed further below, a video tape recorder 112 can be used with this system 100.

As discussed in further detail below, the multiplexor 102 provides a selectively multiplexed video signal 122 which is selectively based upon a number of input video signals 114, 116, 118. The multiplexor 102 receives a plurality of input video signals 114 which can originate from virtually any video source, a previously encoded, time-division multiplexed video input signal 116 (e.g. recorded on and replayed from the video tape recorder 112) and a television signal 118 from the television tuner 110. In accordance with control signals 120 received from the computer/controller 108 (e.g. programmed or user-inputted via the user interface 109), the multiplexor 102 provides a multiplexed video signal 122. When the system 100 is operating as a multiplexor-encoder, the multiplexed video signal 122 is received by the video encoder/decoder 106, and in accordance with control signals 124 received from the computer/controller 108 (e.g. programmed or user-inputted via the user interface 109), produces an encoded video output signal 126. This encoded video output signal 126 can be transferred, e.g. transmitted for remote decoding with another video system 100 for viewing on a display, or stored on video tape via the video tape recorder 112 for later retrieval, decoding and converting, as discussed further below.

When the system 100 is operating as a decoder-converter, the multiplexor 102 receives the encoded, time-division multiplexed video input signal 116, and in accordance with the control signals 120 from the computer/controller 108 (e.g. programmed or user-inputted via the user interface 109), conveys this encoded, time-division multiplexed video signal as its output signal 122. The video encoder/decoder 106 receives this signal 122 and decodes conversion control signals therefrom. In selective accordance with these conversion control signals, as well as others from the computer/controller 108 (e.g. programmed or user-inputted via the user interface 109), the converter 104 receives and converts the encoded, time-division multiplexed video signal 122 from the multiplexor 102 to provide a unified video signal 132 representing the multiplexed video images for display.

Figure 2A:
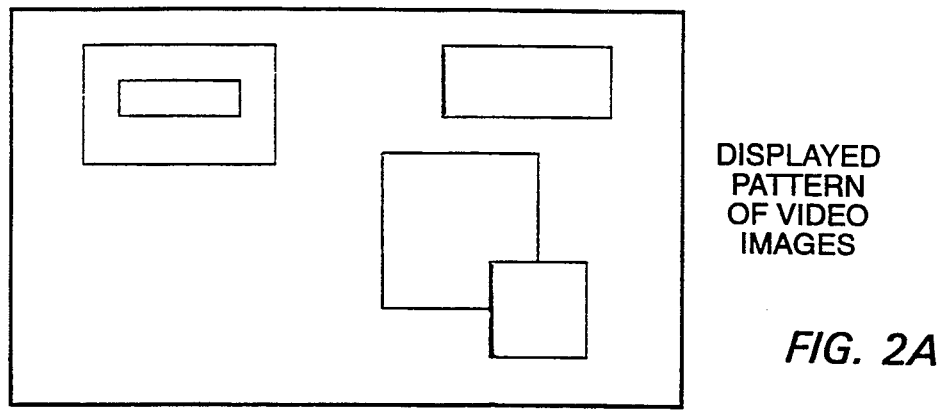
FIGS. 2A and 2B illustrate an exemplary group of video windows combined for simultaneous display in accordance with the present invention.
Figure 2B:
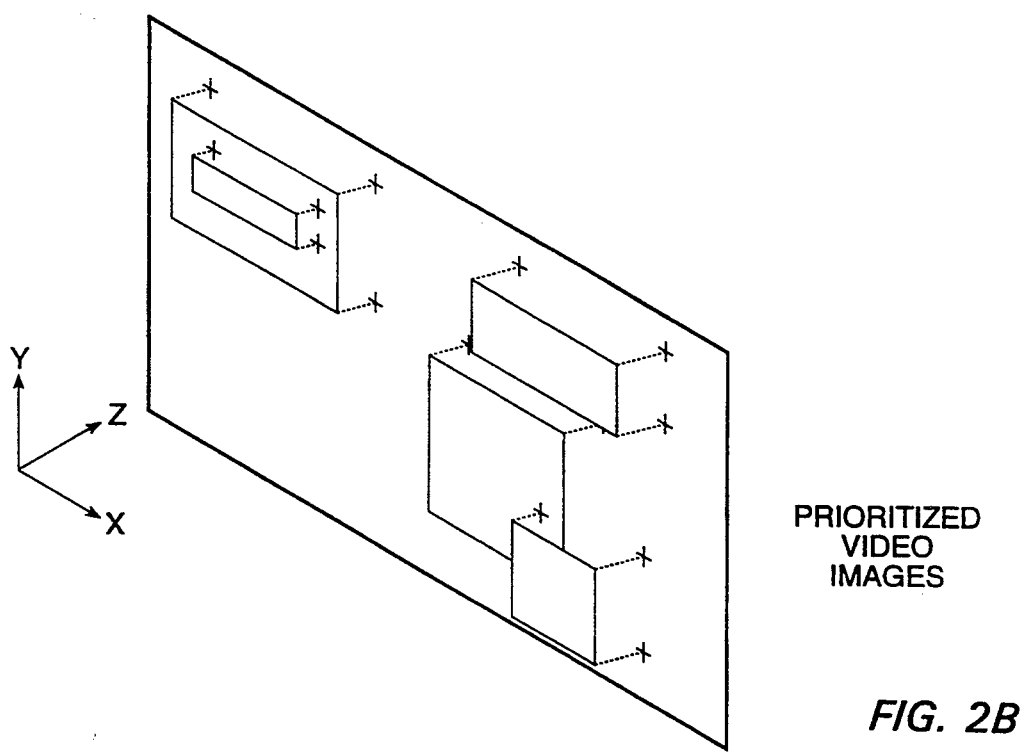

As seen in FIGS. 2A and 2B the video images represented by the unified video signal 132 can be arranged in selected patterns and prioritized for display. The display pattern can be selected to place the video images anywhere within the X-Y plane of the display, as well as prioritize their respective visibilities in accordance with Z data for selectively overlapping display images.

Figure 3:
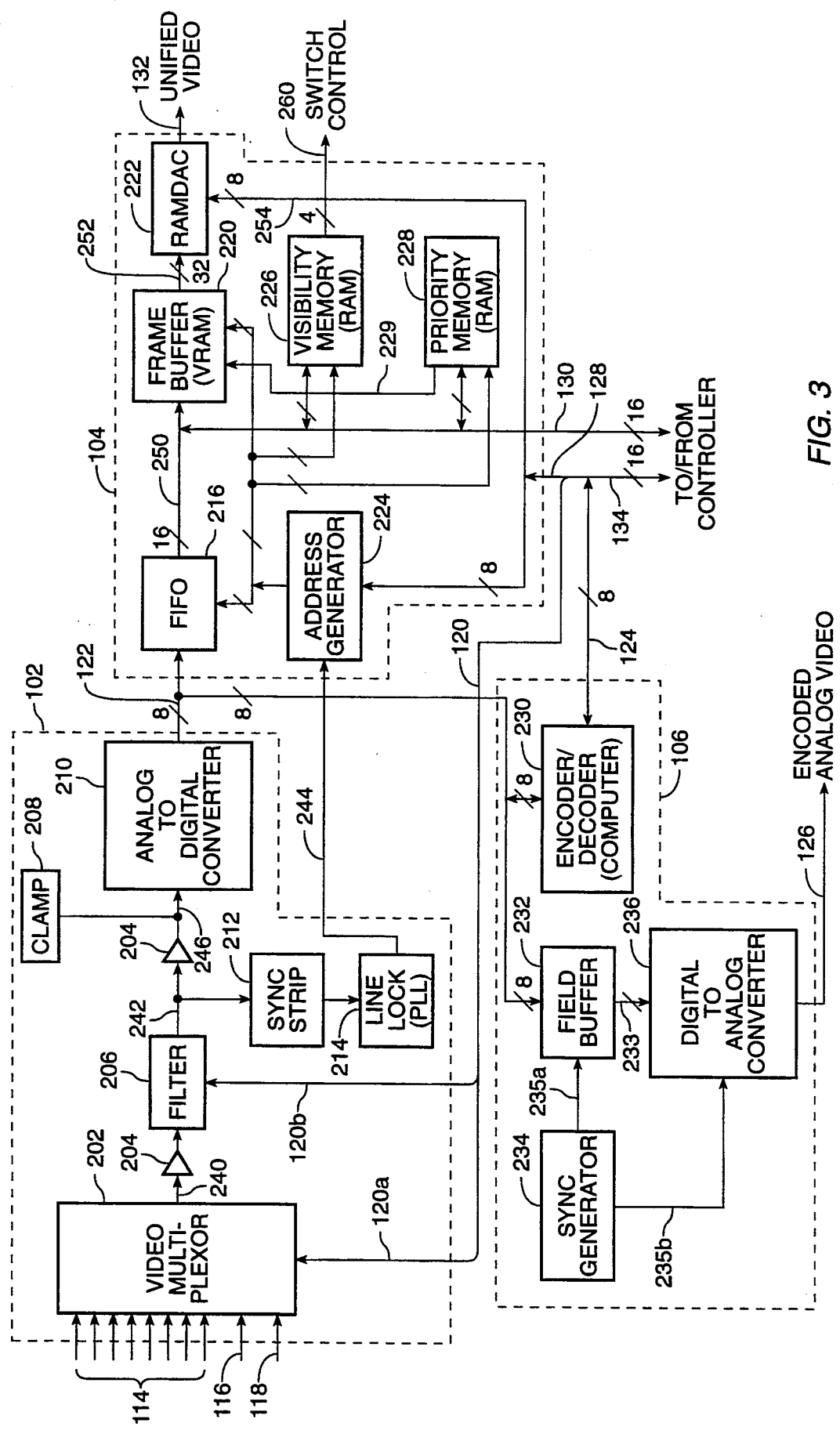
FIG. 3 is a functional block diagram of a video multiplexor-encoder and decoder-converter in accordance with the present invention.

Referring to FIG. 3, the multiplexor 102 includes a video multiplexor 202, buffer amplifiers 204, a filter 206, a clamp circuit 208, an analog-to-digital converter ("ADC") 210, a sync stripper circuit 212 and a "line lock" circuit (e.g. phase-lock loop) 214, all interconnected substantially as shown. The converter 104 includes a first-in, first-out ("FIFO") memory 216, a frame buffer (e.g. VRAM) 220, a RAMDAC 222, an address generator 224, a visibility memory (e.g. RAM) 226 and a priority memory (e.g. RAM) 228, all interconnected substantially as shown. The video encoder/decoder 106 includes an encoder/decoder (e.g. computer or microcontroller) 230, a field buffer (e.g. a FIFO memory or VRAM) 232, a sync generator 234 and a digital-to-analog converter ("DAC") 236, all interconnected substantially as shown.

When the system 100 is operated as a multiplexor-encoder, the video multiplexor 202, in accordance with a control signal 120a, selectively multiplexes its analog input video signals 114, 118 to produce an analog multiplexed video signal 240. The control signal 120a can be varied as desired by the user (e.g. via the user interface 109 [FIG. 1]) to selectively vary the effective video update rate for each of the input video signals 114, 118, i.e. to selectively increase or decrease the rate at which each input video signal 114, 118 contributes to, or appears as part of, the analog multiplexed video signal 240.

This multiplexed signal 240 is buffered, filtered and DC-clamped by the buffer amplifiers 204, filter 206 and clamp circuit 208, respectively. The filter 206 includes low-pass and notch filters and has a notch frequency which can be selected in accordance with a control signal 120b. The filtered, multiplexed video signal 242 has its synchronization pulses removed by the sync stripper circuit 212 and used by the line lock circuit 214 to produce a synchronizing signal 244 for the address generator 224 within the converter 104 (discussed further below). The filtered and clamped, multiplexed video signal 246 is converted to a digital multiplexed video signal 122 by the ADC 210.

The digital multiplexed video signal 122 is received by the field buffer 232 within the video encoder/decoder 106. The field buffer 232 receives the asynchronous data of the digital multiplexed video signal 122 and, in accordance with a control signal 235a from the sync generator 234, provides a synchronous data signal 233.

The field buffer 232 also receives control data from the encoder/decoder 230 which selectively defines the size, position and relative visibility (e.g. viewing priority) of each of the video signals within the time-multiplexed video signal 122, as well as time and date information. This control data sent to the field buffer 232 by the encoder/decoder 230 originates in its non-encoded form and is received from the computer/controller 108 (discussed further below). As discussed in more detail below, this control data is inserted into the inactive video portion corresponding to the vertical interval of the multiplexed video signal 122.

In accordance with the control signal 235a and a clock 235b generated by the free-running sync generator 234, synchronous multiplexed video and control data 233 are retrieved from the field buffer 232, received by the DAC 236, and converted to an encoded analog video signal 126. This conversion is synchronized with the reading of the stored data from the field buffer 232.

When the system 100 is operated as a decoder-converter, the multiplexor 102 selects the encoded, time-division multiplexed video input signal 116 and, after buffering, clamping and analog-to-digital conversion, provides a digital version of the encoded, time-division multiplexed video signal 116 as its output signal 122. (The filtering function of the filter 206 is disabled by a control signal 120b.) This signal 122 is received by the encoder/decoder 230 of the video encoder/decoder 106. The control data encoded therein which defines the size, position and relative visibility of each of the video image signals within the encoded video signal is copied and transferred to the computer/controller 108 (FIG. 1) via interface bus lines 124, 134.

The converter 104 receives the digitized, encoded, time-division multiplexed video signal 122 and stores it in the FIFO 216 for buffering. This storing of the digitized video is done in accordance with a control signal provided by the address generator 224, which is synchronized by the line lock circuit 214. The buffered video data 250 is received by and stored in the frame buffer 220 in accordance with addresses provided by the address generator 224.

It is these addresses provided by the address generator 224 to the frame buffer 220 which selectively define the individual video windows and display pattern therefor (FIG. 2) in selective accordance with the encoded control data copied by the encoder/decoder 230 from the digitized, encoded video data 122 and transferred to the computer/controller 108. As desired, window sizes are controlled by the computer/controller 108 causing the address generator 224 to selectively control the FIFO 216 to perform decimation or replication of the pixel data received from the ADC 210. The control data defining each video window's position, size and visibility priority are transferred to the computer/controller 108 where they are selectively processed, and then transferred to and stored in the address generator 224 and the visibility 226 and priority 228 memories. These control data are then updated every time a video window's position, size or viewing priority changes. The priority memory 228, by way of a write enable signal 229 and in accordance with the visibility priority information within the encoded control data, controls whether selected portions of the buffered video data 250 are written into the frame buffer 220.

The windowed video data 252 is outputted from the frame buffer four pixels at a time to the RAMDAC 222. As discussed further below, the RAMDAC multiplexes the four pixel-wide input data 252 to a one-pixel-wide signal, which is then converted to an analog unified video signal 132.

The visibility memory 226 provides a four bits-wide switch control signal 260. One bit (e.g. the most significant bit [MSB]) is used for selectively controlling the visibility of the unified video signal 132, and three bits are used for generating a color overlay in the output display (discussed further below).

Figure 4:
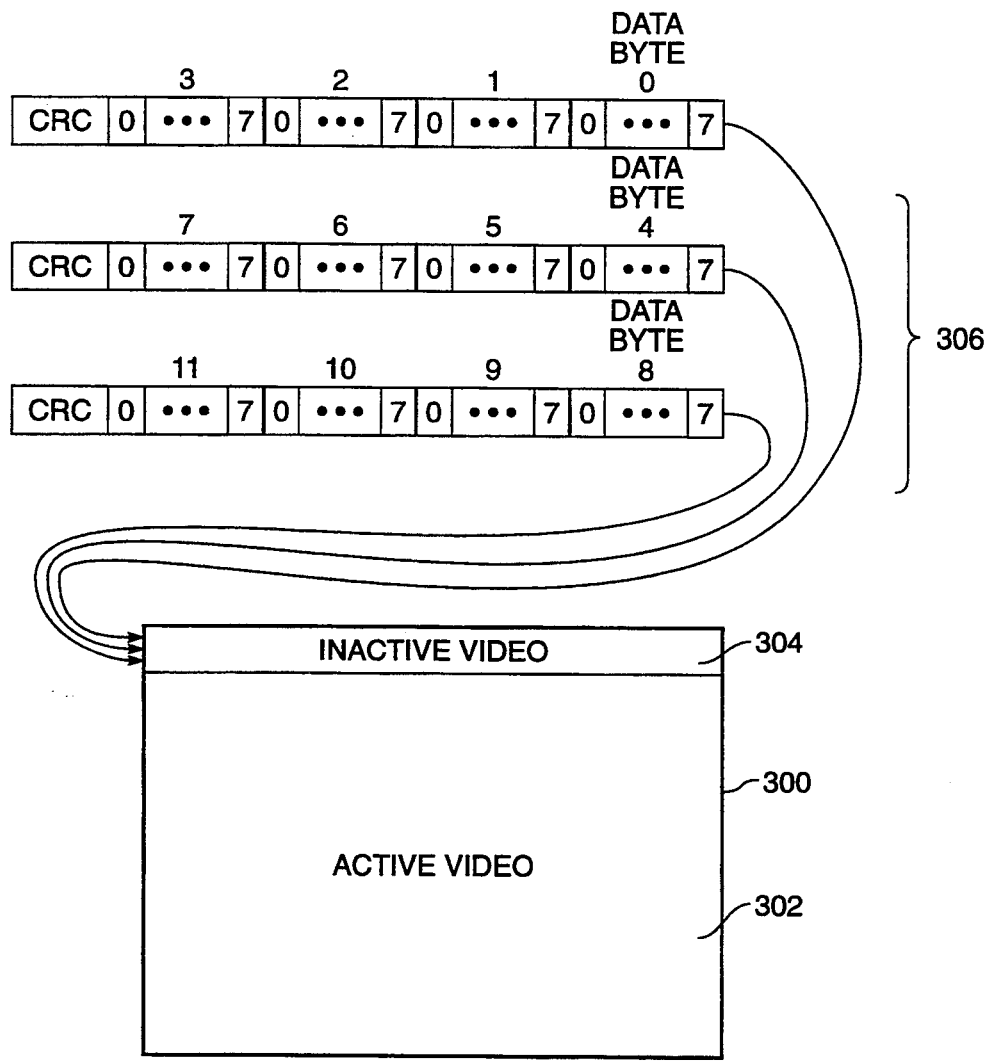
FIG. 4 illustrates the encoding of display control data in accordance with the present invention.

Referring to FIG. 4, the encoding performed by the video encoder/decoder 106 of the selectively multiplexed video signal 122 can be better understood. Each video display field 300 has active 302 and inactive 304 video regions. The control data 306 is encoded, e.g. inserted, into the inactive video region 304.

In a preferred embodiment of the present invention, a total of 120 bits (96 bits of data and 24 bits of CRC code) are encoded at the beginning of each field. These 120 bits of control data take three video lines. Four bytes of control data are grouped and transferred at one time (beginning with the MSB of the first byte), followed by an 8-bit CRC code generated by the polynomial "1000 0011" (for use in detecting bit errors). The first data byte (byte 0) represents status control information. The next four data bytes (bytes 1-4) represent current display window information. The next six data bytes (bytes 5-10) represent time and date information. The last data byte (byte 11) is reserved for later use. (The encoded bit frequency is 1 MHz for NTSC and 1.2 MHz for PAL.)

The format for the control data bytes 306 are as follows:

| Byte | Bit | Description |
| --- | --- | --- |
| 0 | (7) | Current low-res input field |
|  | (6) | Current window freeze status |
|  | (5) | Window data change indicator |
|  | (4) | Interrupt status |
|  | (3 ... 0) | Deleted window number |
| 1 | (7 ... 4) | Current window priority |
|  | (3 ... 0) | Current window number |
| 2 | (7 ... 0) | Window size |
| 3 | (7 ... 0) | Window Y position |
| 4 | (7 ... 0) | Window X position |
| 5 | (7 ... 0) | Current year |
| 6 | (7 ... 0) | Current month |
| 7 | (7 ... 0) | Current date of month |
| 8 | (7 ... 0) | Current hour |
| 9 | (7 ... 0) | Current minute |
| 10 | (7 ... 0) | Current seconds |
| 11 | (7 ... 0) | [Reserved] |

Figure 5:
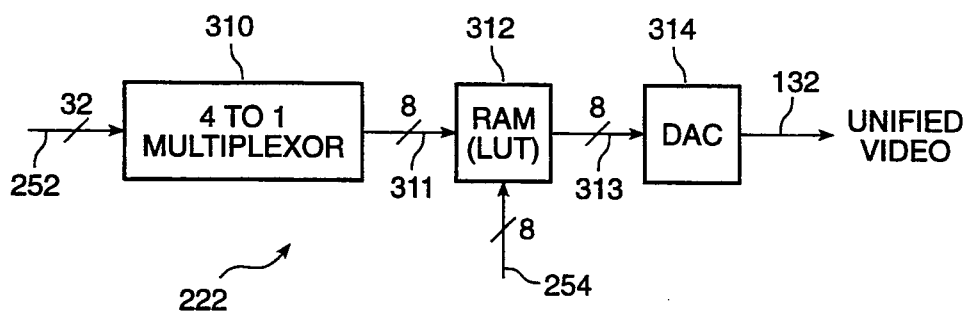
FIG. 5 is a functional block diagram of the RAMDAC of FIG. 3.

Referring to FIG. 5, the RAMDAC 222 includes a four-to-one multiplexor 310, a random access memory (e.g. look-up table) 312 and a digital-to-analog converter 314, all interconnected substantially as shown. The windowed video data 252 is received and multiplexed by the multiplexor 310 from a four pixel-wide to a one pixel-wide signal 311 for addressing the memory 312. The memory 312 provides selectively gray-scaled video data 313, in accordance with gray-scale data 254 received from the computer/controller 108, to the DAC 314 for conversion to the analog unified video signal 132.

Figure 6:
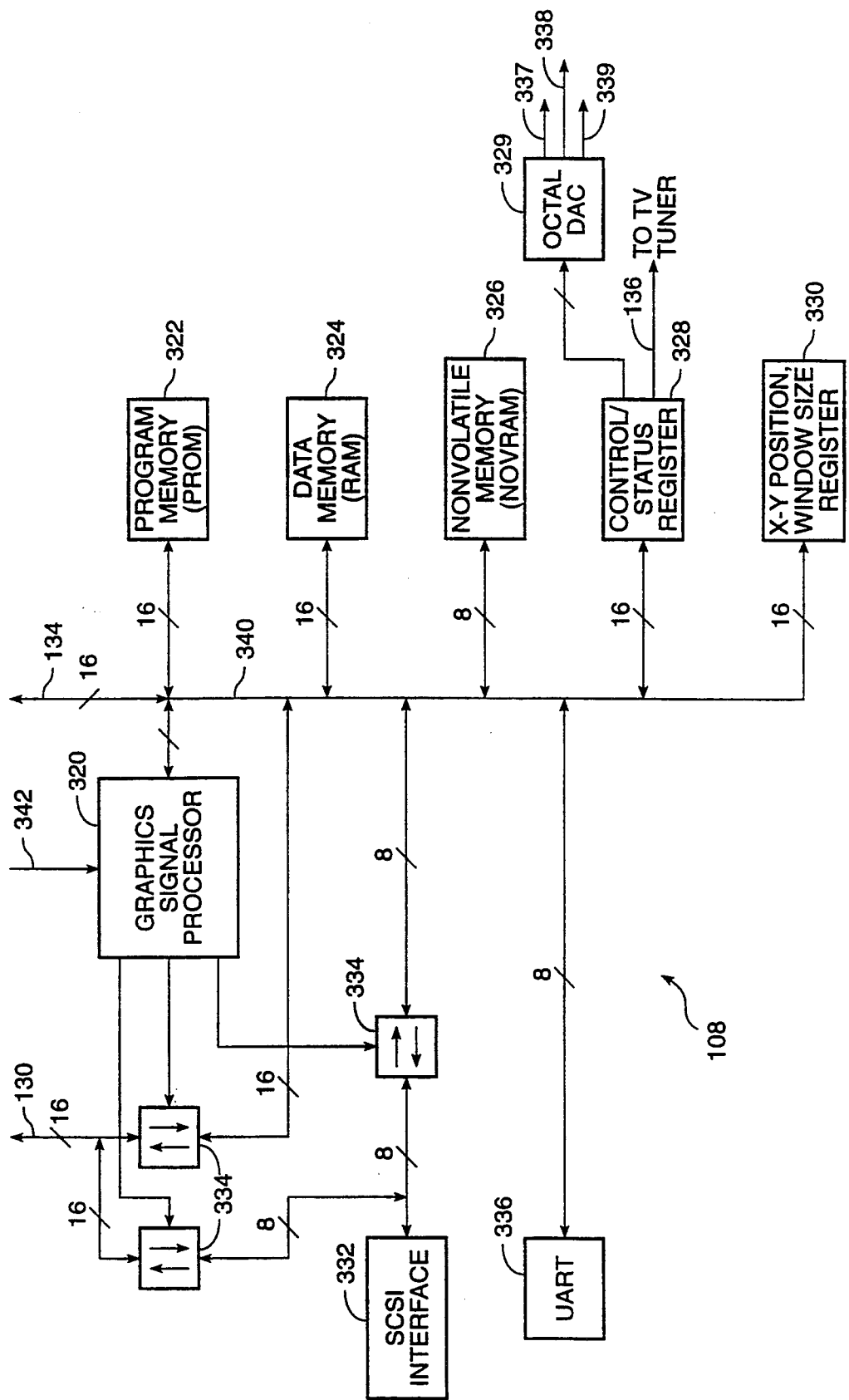
FIG. 6 is a functional block diagram of the controller of FIG. 1.

Referring to FIG. 6, the computer/controller 108 includes: a graphics signal processor 320; a program memory (e.g. PROM) 322; a data memory (e.g. RAM) 324; a non-volatile memory 326; a control/status register 328; an X-Y position and window size register 330; an SCSI ("small computer system interface") interface 332; isolators 334; a serial data port (universal asynchronous receiver-transmitter) 336; and an octal DAC 329; all interconnected substantially as shown. The graphics signal processor 320 is used as the system CPU, with its program instructions stored in the program memory 322 and the data memory 324 available for use as a "scratch pad."

The non-volatile memory 326 stores window data and computer/controller 108 settings during power-down. This stored information is used to reprogram the computer/controller 108 during power-up. The non-volatile memory 326 can also be used as additional data memory. The control/status register 328 receives brightness, contrast and chroma key level data from the data 324 and nonvolatile 326 memories, which are made available as analog brightness 337, chroma key 338 and contrast 339 signals via the octal DAC 329. This register 328 also provides the control signal 136 for the television tuner 110 (FIG. 1). The X-Y position and window size register 330 stores data defining the two-dimensional positions and sizes for the video display windows.

The serial data port 336 provides a bidirectional data interface between the data bus 340 of the computer/controller 108 and a host computer (not shown). The SCSI interface 332 provides an additional bidirectional data interface between the controller data bus 340 and the host computer, as well as means for transferring video data 130, via the isolators 334, to and from the converter 104 (FIG. 3). Access to and by the SCSI interface 332 is controlled with the isolators 334 by the graphic signal processor 320. In a preferred embodiment of the present invention, the graphic signal processor 320 receives an auxiliary synchronization signal 342 (discussed further below).

Figure 7:
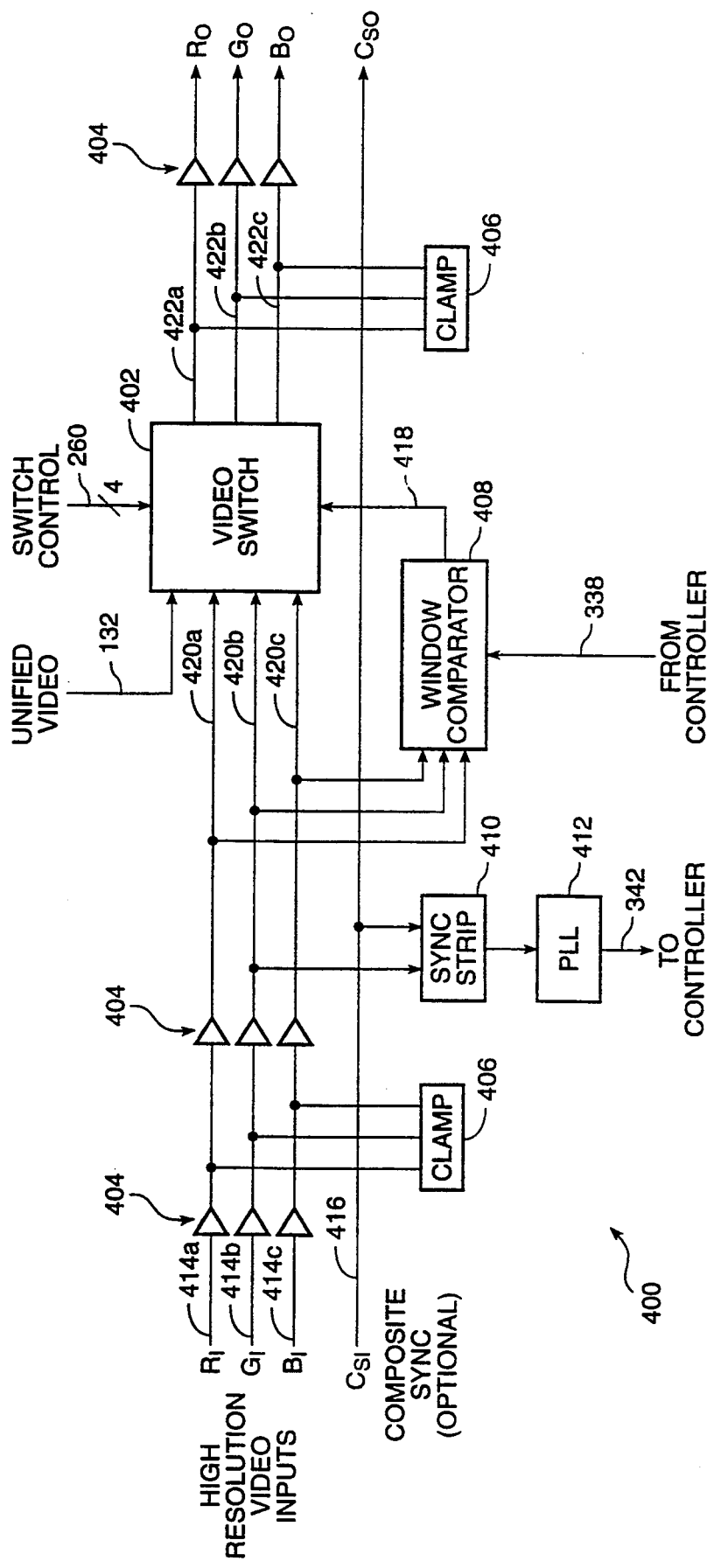
FIG. 7 is a functional block diagram of a video switching network included in a preferred embodiment of the present invention.

Referring to FIG. 7, a preferred embodiment of the present invention includes a high resolution video interface circuit 400, which comprises a video switch 402, buffer amplifiers 404, clamp circuits 406, a (video) window comparator 408, a sync stripper 410 and a phase-lock loop ("PLL") 412, all interconnected substantially as shown. This interface circuit 400 receives high resolution red 414a, green 414b and blue 414c color video signals (and an optional composite sync signal 416). The color signals 414a, 414b, 414c are buffered and DC-clamped for inputting to the video switch 402. The video switch 402, in accordance with the switch control signal 260 (which provides visibility and color overlay data) and a key signal 418, selectively switches between the buffered and clamped high resolution color video signals 420a, 420b, 420c, and the monochrome unified video signal 132.

The window comparator 408 compares the color values of the high resolution input signals 420a, 420b, 420c with the color range of the chroma key signal 338 from the computer/controller 108. Whenever the color values of the high resolution inputs 420a, 420b, 420c fall within the range of the chroma key signal 338 value, and in accordance with the visibility bit of the switch control signal 260, the unified video signal 132 is keyed onto the high resolution inputs 420a, 420b, 420c, thereby producing keyed output video signals 422a, 422b, 422c. Further, depending on the value of the color overlay bits of the switch control signal 260, the video output signals 422a, 422b, 422c will selectively represent different video color overlay patterns.

The video color overlay patterns correspond to the color overlay bits of the switch control signal 260 as follows:

| Bits | Color overlay |
|------|---------------|
| 000  | none          |
| 001  | blue          |
| 010  | green         |
| 011  | cyan          |
| 100  | red           |
| 101  | magenta       |
| 110  | yellow        |
| 111  | white         |

Synchronization between the high resolution video data 420a, 420b, 420c, the unified video data 132 and the switch control signal 260 is accomplished by providing a synchronization signal 342 to the graphics signal processor 320 within the computer/controller 108 (FIG. 6). This synchronization signal 342 is generated by stripping synchronization information from one of the high resolution video inputs 420b or the input composite sync signal 416 with the sync stripper 410, and using it to phase-lock the PLL 412.

It should be understood that various alternatives to the embodiments of the present invention described herein can be employed in practicing the present invention. It is intended that the following claims define the scope of the present invention, and that structures and methods within the scope of these claim and their equivalents be covered thereby.

What is claimed is:

1. A video multiplexor-encoder for receiving, time-division multiplexing and encoding a plurality of video signals representing a plurality of video imaged for transfer and simultaneous display thereof in a pattern of a plurality of video windows on a video display device, the video multiplexor-encoder comprising:
    multiplexor means for receiving and selectively time-division multiplexing a plurality of asynchronous video signals which represent a plurality of corresponding video images to produce a corresponding multiplexed video signal; and
    encoder means coupled to the multiplexor means for receiving and selectively encoding the multiplexed video signal so as to include display control data.

2. A video multiplexor-encoder as recited in claim 1, further comprising computer means coupled to the encoder means for programmably providing the display control data thereto.

3. A video multiplexor-encoder as recited in claim 1, wherein the multiplexor means comprises:
    a video multiplexor for receiving multiplex control data and in accordance therewith time-division multiplexing the received plurality of video signals; and
    an analog-to-digital converter coupled to the video multiplexor for receiving and converting the time-division multiplexed plurality of video signals to the multiplexed video signal.

4. A video multiplexor-encoder as recited in claim 3, further comprising computer means coupled to the encoder means and the multiplexor means for programmably providing the display control data and the multiplex control data thereto, respectively.

5. A video multiplexor-encoder as recited in claim 1, wherein the encoder means comprises:
    computer means for programmably providing the display control data;
    memory means coupled to the computer means and the multiplexor means for receiving and storing the display control data and the multiplexed video signal; and
    a digital-to-analog converter coupled to the memory means for receiving and converting the stored display control data and the stored multiplexed video signal to an analog, encoded, multiplexed video signal.

6. A video multiplexor-encoder for receiving, time-division multiplexing and encoding a plurality of video signals representing a plurality of video images for transfer and simultaneous display thereof in a pattern of a plurality of video windows on a video display device, the video multiplexor-encoder comprising:
    a video multiplexor for receiving multiplex control data and in accordance therewith receiving and time-division multiplexing a plurality of video signals which represent a plurality of corresponding video images;
    an analog-to-digital converter coupled to the video multiplexor for receiving and converting the time-division multiplexed plurality of video signals to a digital multiplexed video signal;
    memory means coupled to the analog-to-digital converter for receiving and storing the digital multiplexed video signal, and for receiving and storing display control data which selectively represent a position, size and relative visibility priority for each one of the plurality of corresponding video images within a display pattern of a plurality of video windows; and
    a digital-to-analog converter coupled to the memory means for receiving and converting the stored display control data and the stored digital multiplexed video signal to an analog, encoded, multiplexed video signal.

7. A video multiplexor-encoder as recited in claim 6, further comprising a computer coupled to the memory means and the video multiplexor for programmably providing the display control data and the multiplex control data thereto, respectively.

8. A video decoder-converter for receiving, decoding and converting an encoded, time-division multiplexed video signal representing a plurality of video images for simultaneous display thereof in a pattern of a plurality of video windows on a video display device, the video decoder-converter comprising:
    decoder means for receiving and decoding an encoded, time-division multiplexed video signal by copying display control data included therein; and converter means coupled to the decoder means for receiving the copied display control data and in selective accordance therewith receiving and converting the encoded, time-division multiplexed video signal to provide a unified video signal which represents the plurality of video images.

9. A video decoder-converter as recited in claim 8, wherein the decoder means comprises a computer for receiving the digital, encoded multiplexed video signal and copying the display control data included therein.

10. A video decoder-converter as recited in claim 8, wherein the converter means comprises:
  display memory means for receiving a plurality of memory write addresses and in accordance therewith receiving and storing the encoded, time-division multiplexed video signal, and for retrieving and outputting the stored encoded, time-division multiplexed video signal as a video display signal which represents the plurality of video images within the display pattern of the plurality of video windows; and
  address generator means coupled to the decoder means and the display memory means for receiving the copied display control data and in selective accordance therewith providing the plurality of memory write addresses.

11. A video decoder-converter as recited in claim 10, wherein the display memory means comprises:
  first memory means for receiving and storing the encoded, time-division multiplexed video signal, and for providing a first plurality of stored video data; and
  second memory means coupled to the first memory means and the address generator means for receiving the plurality of memory write addresses and in accordance therewith receiving the first plurality of stored video data, and for providing a second plurality of stored video data as the video display signal.

12. A video decoder-converter as recited in claim 10, wherein the converter means further comprises RAMDAC means for receiving the video display signal and providing a selectively color-mapped, analog video signal as the unified video signal.

13. A video decoder-converter for receiving, decoding and converting an encoded, time-division multiplexed video signal representing a plurality of video images for simultaneous display thereof in a pattern of a plurality of video windows on a video display device, the video decoder-converter comprising:
  an analog-to-digital converter for receiving and converting an encoded, time-division multiplexed video signal which includes display control data to a digital, encoded multiplexed video signal which includes digital control data corresponding to the display control data, wherein the display control data selectively represent a position, size and relative visibility priority for each one of a plurality of video images within a display pattern of a plurality of video windows;
  computer means coupled to the analog-to-digital converter for receiving the digital, encoded multiplexed video signal and copying the digital control data included therein;
  display memory means coupled to the analog-to-digital converter for receiving a plurality of memory write addresses and in accordance therewith receiving and storing the digital, encoded multiplexed video signal, and for retrieving and outputting the stored digital, encoded multiplexed video signal as a video display signal which represents the plurality of video images within the display pattern of the plurality of video windows; and
  address generator means coupled to the computer means and the display memory means for receiving the copied display control data and in selective accordance therewith providing the plurality of memory write addresses.

14. A video decoder-converter as recited in claim 13, wherein the display memory means comprises:
  first memory means for receiving and storing the digital, encoded multiplexed video signal, and for providing a first plurality of stored video data; and
  second memory means coupled to the first memory means and the address generator means for receiving the plurality of memory write addresses and in accordance therewith receiving the first plurality of stored video data, and for providing a second plurality of stored video data as the video display signal.

15. A video decoder-converter as recited in claim 13, further comprising a RAMDAC for receiving the video display signal and providing a selectively color-mapped, analog video signal which represents the plurality of video images within the display pattern of the plurality of video windows.

16. A video multiplexing-encoded method for receiving, time-division multiplexing and encoding a plurality of video signals representing a plurality of video images for transfer and simultaneous display thereof in a pattern of a plurality of video windows on a video display device, the video multiplexing-encoding method comprising the steps of:
  receiving a plurality of asynchronous video signals which represent a plurality of corresponding video images;
  selectively time-division multiplexing the plurality of video signals for providing a multiplexed video signal; and
  selectively encoding the multiplexed video signal by combining display control data therewith.

17. A video multiplexing-encoding method as recited in claim 16, wherein the step of selectively time-division multiplexing the plurality of video signals for providing the multiplexed video signal comprises the steps of:
  receiving multiplex control data;
  time-division multiplexing the plurality of video signals in accordance with the multiplex control data; and
  converting the time-division multiplexed plurality of video signals to a digital video signal as the multiplexed video signal.

18. A video multiplexing-encoding method as recited in claim 16, wherein the step of selectively encoding the multiplexed video signal by combining the display control data therewith comprises the steps of:
  receiving and storing the display control data;
  receiving and storing the multiplexed video signal; and
  converting the stored display control data and the stored multiplexed video signal to an analog, encoded, multiplexed video signal.

19. A video decoding-converting method for receiving, decoding and converting an encoded, time-division multiplexed video signal representing a plurality of video images for simultaneous display thereof in a pattern of a plurality of video windows on a video display device, the video decoding-converting method comprising the steps of:
- receiving an encoded, time-division multiplexed video signal which includes display control data;
- decoding the encoded, time-division multiplexed video signal by copying the display control data included therein; and
- converting the encoded, time-division multiplexed video signal in selective accordance with the copied display control data to provide a unified video signal which represents the plurality of video images within the display pattern of the plurality of video windows.

20. A video decoding-converting method as recited in claim 19, wherein the step of decoding the encoded, time-division multiplexed video signal by copying the display control data included therein comprises copying the display control data in a computer.

21. A video decoding-converting method as recited in claim 19, wherein the step of converting the encoded, time-division multiplexed video signal in accordance with the copied display control data comprises the steps of:
- generating a plurality of memory write addresses in selective accordance with the copied display control data;
- storing the encoded, time-division multiplexed video signal in a memory; and
- retrieving and outputting the stored encoded, time-division multiplexed video signal in accordance with the generated plurality of memory write addresses to provide a unified video display signal which represents the plurality of video images within the display pattern of the plurality of video windows.

22. A video decoding-converting method as recited in claim 21, wherein
the step of storing the encoded, time-division multiplexed video signal in a memory comprises the steps of:
- receiving and storing the encoded, time-division multiplexed video signal as a first plurality of stored video data;
- retrieving and re-storing the first plurality of stored video data as a second plurality of stored video data, stored in accordance with a generated plurality of memory write addresses; and
the step of retrieving and outputting comprises retrieving and outputting the second plurality of stored video data to provide the unified video display signal which represents the plurality of video images within the display pattern of the plurality of video windows.

23. A video decoding-converting method as recited in claim 21, further comprising the steps of:
- inputting the video display signal as an address to a RAMDAC; and
- outputting from the RAMDAC a selectively color-mapped, analog video signal which represents the plurality of video images within the display pattern of the plurality of video windows.

24. A video multiplexor-encoder as recited in claim 1, wherein said display control data represents data selected from the group consisting of a position, a size and a relative visibility priority for each one of the plurality of corresponding video images within a display pattern of a plurality of video windows.

25. A video multiplexor-encoder for receiving, time-division multiplexing and encoding a plurality of video signals representing a plurality of video images for transfer and simultaneous display thereof in a pattern of a plurality of video windows on a video display device, the video multiplexor-encoder comprising:
- a video multiplexor for receiving multiplex control data and in accordance therewith receiving and time-division multiplexing a plurality of video signals which represent a plurality of corresponding video images;
- an analog-to-digital converter coupled to the video multiplexor for receiving and converting the time-division multiplexed plurality of video signals to a digital multiplexed video signal;
- memory means coupled to the analog-to-digital converter for receiving and storing the digital multiplexed video signal, and for receiving and storing display control data; and
- a digital-to-analog converter coupled to the memory means for receiving and converting the stored display control data and the stored digital multiplexed video signal to an analog, encoded, multiplexed video signal.

26. A video decoder-converter as recited in claim 8, wherein said display control data represents data selected from the group consisting of a position, a size and a relative visibility priority for each one of a plurality of video images within a display pattern of a plurality of video windows.

27. A video decoder-converter for receiving, decoding and converting an encoded, time-division multiplexed video signal representing a plurality of video images for simultaneous display thereof in a pattern of a plurality of video windows on a video display device, the video decoder-converter comprising:
- an analog-to-digital converter for receiving and converting an encoded, time-division multiplexed video signal which includes display control data to a digital, encoded multiplexed video signal;
- computer means coupled to the analog-to-digital converter for receiving the digital, encoded multiplexed video signal and copying the digital control data included therein;
- display memory means coupled to the analog-to-digital converter for receiving a plurality of memory write addresses and in accordance therewith receiving and storing the digital, encoded multiplexed video signal, and for retrieving and outputting the stored digital, encoded multiplexed video signal as a video display signal which represents the plurality of video images within the display pattern of the plurality of video windows; and
- address generator means coupled to the computer means and the display memory means for receiving the copied display control data and in selective accordance therewith providing the plurality of memory write addresses.

28. A video multiplexor-encoding method as recited in claim 16, wherein said display control data represents data selected from the group consisting of a position, a size and a relative visibility priority for each one of the plurality of corresponding video images within a display pattern of a plurality of video windows.

29. A video decoding-converting method as recited in claim 19, wherein said display control data represents data selected from the group consisting of a position, a size and a relative visibility priority for each one of the plurality of corresponding video images within a display pattern of a plurality of video windows.

* * * * *

UNITED STATES PATENT AND TRADEMARK OFFICE
CERTIFICATE OF CORRECTION

| | |
|---|---|
| PATENT NO. | : 5,351,129 |
| APPLICATION NO. | : 07/856584 |
| DATED | : September 27, 1994 |
| INVENTOR(S) | : Patrick Lai |

Page 1 of 1

It is certified that error appears in the above-identified patent and that said Letters Patent is hereby corrected as shown below:

In the Title Page:

In the (54) Title section, add --FOR TIME-DIVISION MULTIPLEXING AND ENCODING MULITPLE VIDEO SIGNALS-- after "converter".

In the Claims:

In line 3 of claim 1, change "imaged" to --images--.

Signed and Sealed this

Eighth Day of April, 2008

JON W. DUDAS
*Director of the United States Patent and Trademark Office*

UNITED STATES PATENT AND TRADEMARK OFFICE
CERTIFICATE OF CORRECTION

PATENT NO. : 5,351,129
APPLICATION NO. : 07/856584
DATED : September 27, 1994
INVENTOR(S) : Patrick Lai It is certified that error appears in the above-identified patent and that said Letters Patent is hereby corrected as shown below:

In the Title Page:

In the (54) and Column 1, line 2 Title section, add --FOR TIME-DIVISION MULTIPLEXING AND ENCODING MULITPLE VIDEO SIGNALS-- after "converter".

In the Claims:

In line 3 of claim 1, change "imaged" to --images--.

This certificate supersedes the Certificate of Correction issued April 8, 2008.

Signed and Sealed this

Sixth Day of May, 2008

JON W. DUDAS
*Director of the United States Patent and Trademark Office*